United States Patent
Yancey et al.

(10) Patent No.: US 11,503,012 B1
(45) Date of Patent: Nov. 15, 2022

(54) CLIENT AUTHENTICATION USING A CLIENT CERTIFICATE-BASED IDENTITY PROVIDER

(71) Applicant: Amazon Technologies, Inc., Seattle, WA (US)

(72) Inventors: Justin Paul Yancey, Seattle, WA (US); Jack A. Drooger, Seattle, WA (US); Beau Jared Hunter, Seattle, WA (US); Harvir Singh, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 423 days.

(21) Appl. No.: 16/456,770

(22) Filed: Jun. 28, 2019

(51) Int. Cl.
*H04L 9/40* (2022.01)

(52) U.S. Cl.
CPC ...... *H04L 63/0823* (2013.01); *H04L 63/0884* (2013.01); *H04L 63/102* (2013.01); *H04L 63/168* (2013.01); *H04L 63/20* (2013.01)

(58) Field of Classification Search
CPC . H04L 63/0823; H04L 63/168; H04L 63/102; H04L 63/0884; H04L 63/20
See application file for complete search history.

(56) References Cited

U.S. PATENT DOCUMENTS

| | | | | |
|---|---|---|---|---|
| 9,426,140 | B2* | 8/2016 | Palmeri | H04L 63/166 |
| 2008/0189778 | A1* | 8/2008 | Rowley | H04L 9/3213 726/9 |
| 2010/0217975 | A1* | 8/2010 | Grajek | H04L 9/3226 713/157 |
| 2010/0250948 | A1* | 9/2010 | Little | H04L 9/3263 713/175 |
| 2014/0344908 | A1* | 11/2014 | Rizzo | H04L 63/168 709/219 |
| 2015/0172277 | A1* | 6/2015 | Hoggan | H04L 63/0815 726/6 |
| 2016/0219060 | A1* | 7/2016 | Karunakaran | H04W 12/06 |
| 2019/0058706 | A1 | 2/2019 | Feijoo et al. | |

* cited by examiner

Primary Examiner — Khoi V Le
(74) Attorney, Agent, or Firm — Robert C. Kowert; Kowert, Hood, Munyon, Rankin & Goetzel, P.C.

(57) ABSTRACT

A service or load balancer may use the techniques herein to perform client authentication using a certificate-based identity provider. A client may send a request for access to a service of the provider network. In response, the service or a load balancer may redirect the request to a certificate-based identity provider in accordance with a standard identity protocol (e.g., a federated identity protocol such as the protocol for OpenID Connect (OIDC)). The certificate-based identity provider may obtain a client certificate and validate the client certificate. The identity provider may also obtain and verify other credentials. In response to validating the client certificate (and in some cases authenticating the credentials), the certificate-based identity provider may generate and sign an identity token and redirect the client back to the service in accordance with the identity protocol.

20 Claims, 10 Drawing Sheets

CLIENT AUTHENTICATION USING A CLIENT CERTIFICATE-BASED IDENTITY PROVIDER

BACKGROUND

As the internet becomes more integrated throughout various aspects of both personal and business environments, the number of different systems accessed by users and various computing devices has been rising. An increasingly common separation of users from systems requiring access is a by-product of the decentralization brought about by the growth of the internet. Evolving identity management challenges, such as those associated with cross-company, cross-domain access, have given rise to an approach to identity management, known now as "federated" identity management.

Federated identity management includes the use of technologies and associated standards that enable portability of identity information across otherwise autonomous security domains. Federated identity management may enable cross-domain, web-based single sign-on. For example, a user that attempts to access a service at a particular website may be redirected to another website that serves as a federated identity provider. The federated identity provider may authenticate the user (e.g., based on credentials such as a username and password) and then redirect the user back to the particular website (the relying party), providing an indication that the user was authenticated. The particular website may then provide access to the service for the user. In some cases, the authentication provided by the federated identity provider to a relying party may not be sufficiently reliable and might be circumvented by a malicious actor. Moreover, the relying party may not have the resources to ensure that users are subjected to a sufficient level of authentication before providing access.

Figure 1:
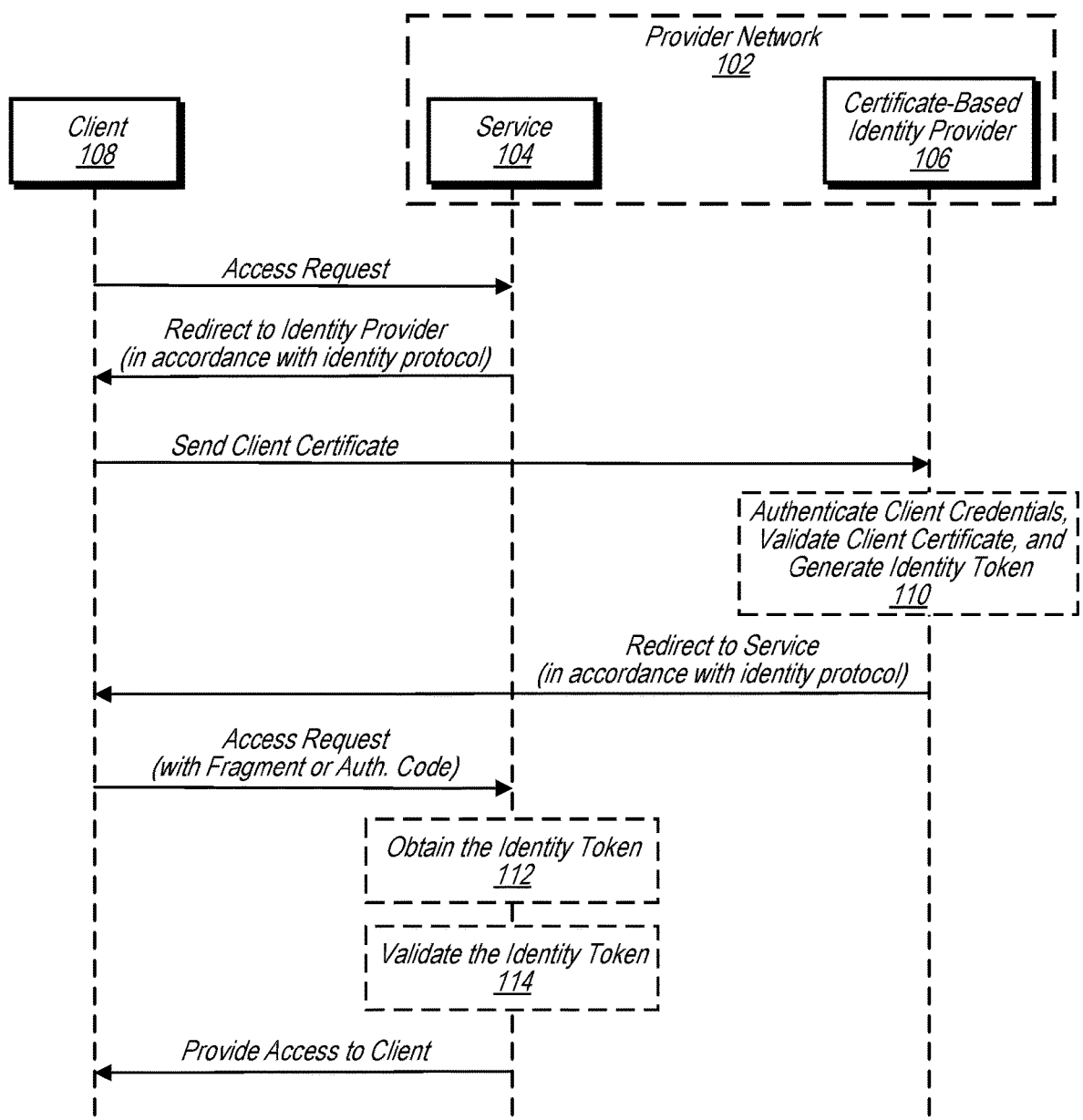
FIG. 1 illustrates performing client authentication using a certificate-based identity provider, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement techniques for performing client authentication using a certificate-based identity provider. In embodiments, one or more clients (e.g., user, web browser/application, mobile device or other computing device) of a provider network may each send a request for access to a service of the provider network. In response, the service or a load balancer may redirect the request to a certificate-based identity provider and/or receive a redirected request back from the service or load balancer in accordance with any suitable identity protocol (e.g., a federated identity protocol such as Security Assertion Markup Language 2.0 (SAML 2.0), OpenID, the protocol used for OpenID Connect (OIDC), an identity layer on top of OAuth 2.0, etc.). In embodiments, OIDC specifies JavaScript object notation (JSON)-formatted identity tokens (JWT) that may be issued by an identity provider (e.g., the certificate-based identity provider) to OIDC client applications/relying parties (e.g., the service or the load balancer).

In embodiments, the certificate-based identity provider may authenticate a client using a client certificate that is provided by the client to the certificate-based identity provider (e.g., a client certificate, such as an X.509 public key certificate, that was previously issued to the client by a certificate authority (CA) and/or signed by the CA). To authenticate the client, the certificate-based identity provider may obtain the client certificate from the client and authenticate it based on a CA certificate stored and/or accessed by the certificate-based identity provider. In various embodiments, the certificate authority may be independent of the provider network (e.g., external to the provider network) or may be within the provider network (e.g., a service of the provider network).

In some embodiments, to authenticate the client, the certificate-based identity provider may also obtain one or more other authentication credentials from the client (e.g., username, password, and/or personal identification number (PIN), etc.) and authenticate based at least on security information associated with the client that is stored by the provider network (e.g., username and password information). This may allow the certificate-based identity provider to improve/increase security by implementing multi-factor authentication (e.g., using client certificate authentication in addition to any number of other credentials).

In various embodiments, the certificate-based identity provider may extract the client certificate from the request and validate or invalidate the client certificate (e.g., determine whether the client certificate was signed by a trusted CA, whether it is expired, etc.). For example, the certificate-based identity provider may identify one or more registered CA certificates or a preconfigured CA chain (e.g., obtained/downloaded by the identity provider from a trusted CA) and validate the client certificate against the one or more registered CA certificates or the preconfigured CA chain.

In embodiments, the certificate-based identity provider may validate the client certificate based on security information associated with (e.g., included in) one or more registered CA certificates obtained/access by the certificate-based identity provider. For example, a public key included in one of the registered CA certificates that was downloaded from a trusted CA may be used to determine whether the client certificate has been signed the same trusted CA that signed the client certificate. If so, then the client certificate may be validated. If not, then it may be invalidated. As described herein, various other actions may also be performed to validate (e.g., accept) or invalidate (e.g., reject) the client certificate.

In response to the certificate-based identity provider authenticating the credentials and/or validating the client certificate, the certificate-based identity provider may generate an identity token (e.g., signed with a private key of the certificate-based identity provider) and redirect the client back to the service in accordance with the identity protocol. The service may then obtain the identity token and provide the requested access to the client based on the identity token.

Various embodiments may allow a service to take advantage of the higher levels of security associated with client certificate authentication and/or mutual transport layer security (TLS) authentication using client certificates, even though the service may not have knowledge of client certificates and/or capability to authenticate using client certificates. The service may do so by offloading client certificate certification to the certificate-based identity provider. Therefore, the service (and/or a load balancer) may leverage the benefits of client certificate authentication and/or mutual TLS authentication simply by following the standards and/or the protocols for OIDC or any other defined identity protocol for federated identity authentication, without the need for developers to build support for client certificate authentication and/or mutual TLS authentication in the service itself.

FIG. 1 illustrates performing client authentication using a certificate-based identity provider, according to some embodiments. In embodiments, the provider network 102, the service 104, the certificate-based identity provider 106, the client 108, and/or any other components depicted in FIG. 1 may be the same as or include one or more of the same components as the provider network, services, certificate-based identity provider, clients and/or any other components depicted in any of FIGS. 2-8. FIG. 9 depicts an example computer system(s) that may implement a provider network, services, certificate-based identity provider, clients and/or any other components depicted in any of FIGS. 1-8.

In embodiments, a client 108 may send a request for access to a service 104 of the provider network (e.g., to access/use one or more functions of the service such as data computation and/or data storage/access functions). In some embodiments, the client 108 may be external to the provider network 102 (e.g., at a remote client network) or the client may be within the provider network 102. In response, the service may redirect the client to the certificate-based identity provider 106 in accordance with an identity protocol. For example, the service may provide a response to a client web browser that includes a URL address/endpoint for the certificate-based identity provider 106.

Although the identity provider 106 is shown within the same local network 102 as the service 104, in embodiments the service 104 and the identity provider 106 may be in different networks (e.g., the service 104 would be within the service provider network 102 and the identity provider 106 would be within a different local or private network). Thus, in embodiments, the provider network 102 may instead represent a wide-area network (e.g., the internet) and the service 104 may be in a remote network with respect to the identity provider 106. In some embodiments, the client may also be in its own local network, remote from the provider network 102 or the respective networks that include the service 104 and the identity provider 106.

In the illustrative embodiment, the certificate-based identity provider 106 may obtain client credentials and/or a client certificate from the client. For example, the certificate-based identity provider 106 may request client credentials and/or a client certificate form the client and in response, the client may send the client credentials and/or the client certificate to the certificate-based identity provider 106. The certificate-based identity provider 106 may then authenticate the client credentials and/or validate the client certificate and generate and identity (ID) token based on the client certificate 110.

In embodiments, the certificate-based identity provider 106 validates the client certificate at least by determining that the client certificate was signed by a particular certificate authority (e.g., signed by the same certificate authority that signed a CA certificate provided to the certificate-based identity provider and/or provider network). In some embodiments, it may be useful to authenticate based on a client certificate without the need to obtain any other credentials (e.g., username, password, etc.). For example, a sensor or other edge device of a client network may be authenticated based on a client certificate and/or device identifier.

In embodiments, the certificate-based identity provider 106 may sign the token using a private key of the certificate-based identity provider 106 (e.g., in accordance with an identity protocol) that is inaccessible to some or any components outside of the certificate-based identity provider 106 (e.g., inaccessible to any clients and/or to any services of the provider network). In some embodiments, the certificate-based identity provider 106 may then redirect the client back to the service in accordance with the identity protocol. For example, the service may provide a response to the client web browser that includes a URL address/endpoint for the service. In some embodiments, the redirecting includes sending an access request to the service that includes the signed token in the URL as a fragment (e.g., "implicit" flow). In some embodiments, the redirecting includes sending an access request to the service that includes sending an "auth" code as a query parameter (e.g., "auth code" flow).

As shown, the service may then obtain the signed identity token. For the implicit flow, this may include extracting the token from the URL fragment. For the auth code flow, them may include sending a token request to the certificate-based identity provider 106 (or another service that stores the signed token). The token request may include the auth code and/or a client secret stored by the provider network and/or the service. The certificate-based identity provider 106 (or other service) may validate the auth code and/or client secret and in response, send the token to the service.

In embodiments, the service may then validate the identity token. The service may do so by verifying that the identity token was signed by the certificate-based identity provider 106 (e.g., based on a public key corresponding to the certificate-based identity provider's private key). For example, the service may use the public key to decrypt a signed portion of the token and compare the decrypted portion to another unsigned portion of the token and if they match, the service may determine that the identity was signed by the certificate-based identity provider (validating the token/verifying authenticity of the identity token). In embodiments, the service may then provide the requested access to the client (e.g., access/use one or more functions of the service such as data computation and/or data storage/access functions).

Figure 2:
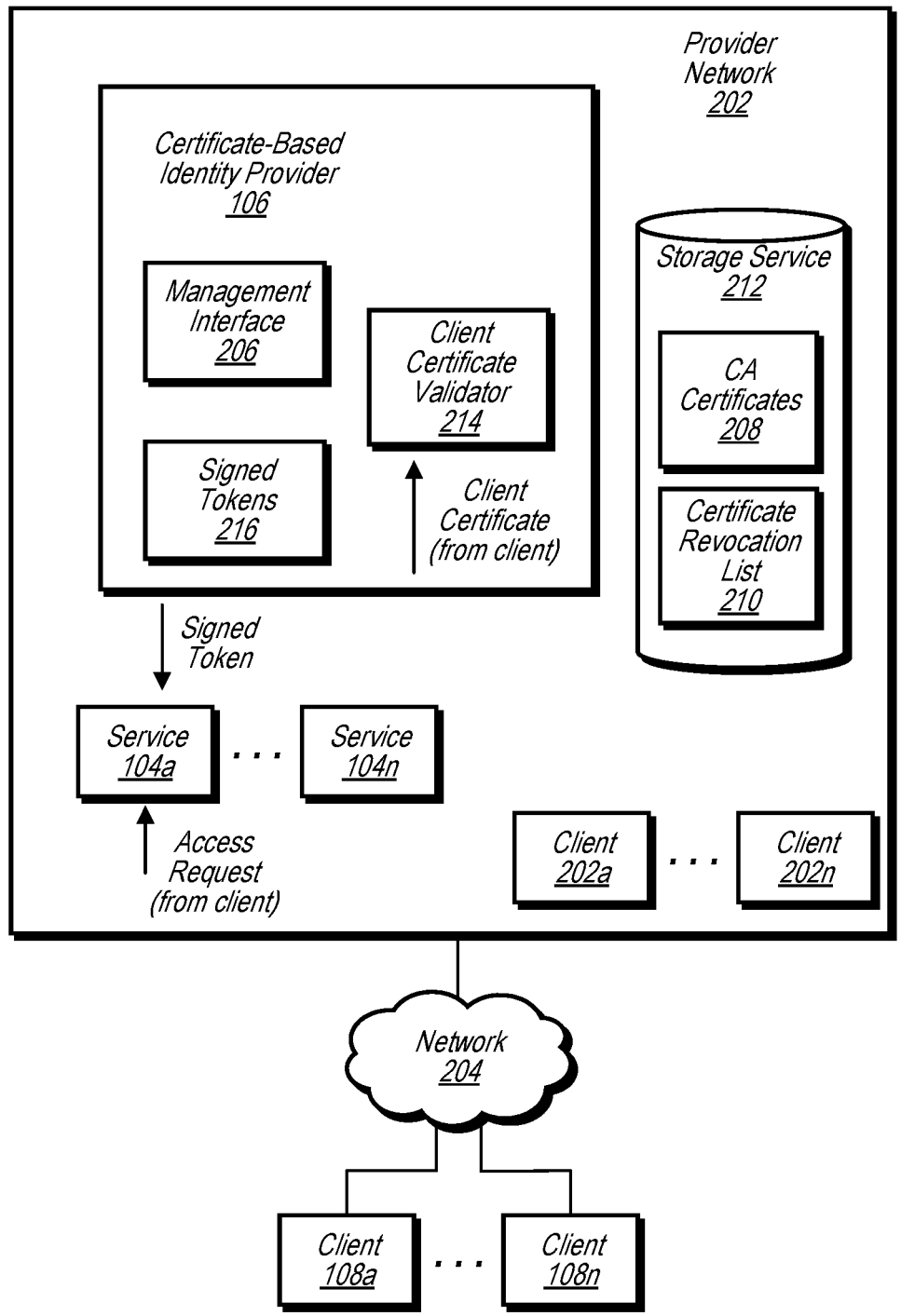
FIG. 2 illustrates a system for performing client authentication using a certificate-based identity provider, according to some embodiments.

FIG. 2 illustrates a system for performing client authentication using a certificate-based identity provider, according to some embodiments. In the depicted embodiment, there may be any number of external clients 108 and/or internal clients 202 of each service 104. As shown, the external clients may communicate with the provider network 102 via a wide-area network 204 (e.g., the internet).

In embodiments, the certificate-based identity provider 106 includes a management interface 206 that may be used to configure the certificate-based identity provider 106 (e.g., modify functionality of various components, download CA certificates 208 and/or certificate revocation lists 210 to a storage service 212, modify/change one or more websites that are used to access the CA certificates and/or CRLs, etc.).

The certificate-based identity provider may also include a client certificate validator 214. The client certificate validator may be used to validate a client certificate based on one or more certificate authority (CA) certificates 208 issued by a CA (e.g., registered CA certificates) and/or certificate revocation lists (CRLs) 210. For example, the identity provider may use the credentials/key of a registered CA certificate to verify authenticity of a client certificate. The CA certificates 208 and/or the CRLs 210 may be obtained/downloaded from one or more remote trusted CAs (e.g., websites) and stored at the storage service as registered CA certificates. The client certificate validator 214 and/or the identity provider 106 may obtain/access the registered CA certificates 208 and/or the CRLs 210. In embodiments, the client certificate validator 214 and/or the identity provider 106 may obtain/access the CA certificates 208 and/or the CRLs 210 from one or more other sources (e.g., from a website).

As shown, the certificate-based identity provider 106 also includes one or more signed tokens 216. The signed tokens may include one or more tokens that were recently generated by the certificate-based identity provider 106 (e.g., based on client certificates) and stored at the certificate-based identity provider 106 so that they are available to be retrieved by a service or load balancer (e.g., using the auth code flow).

Figure 3:
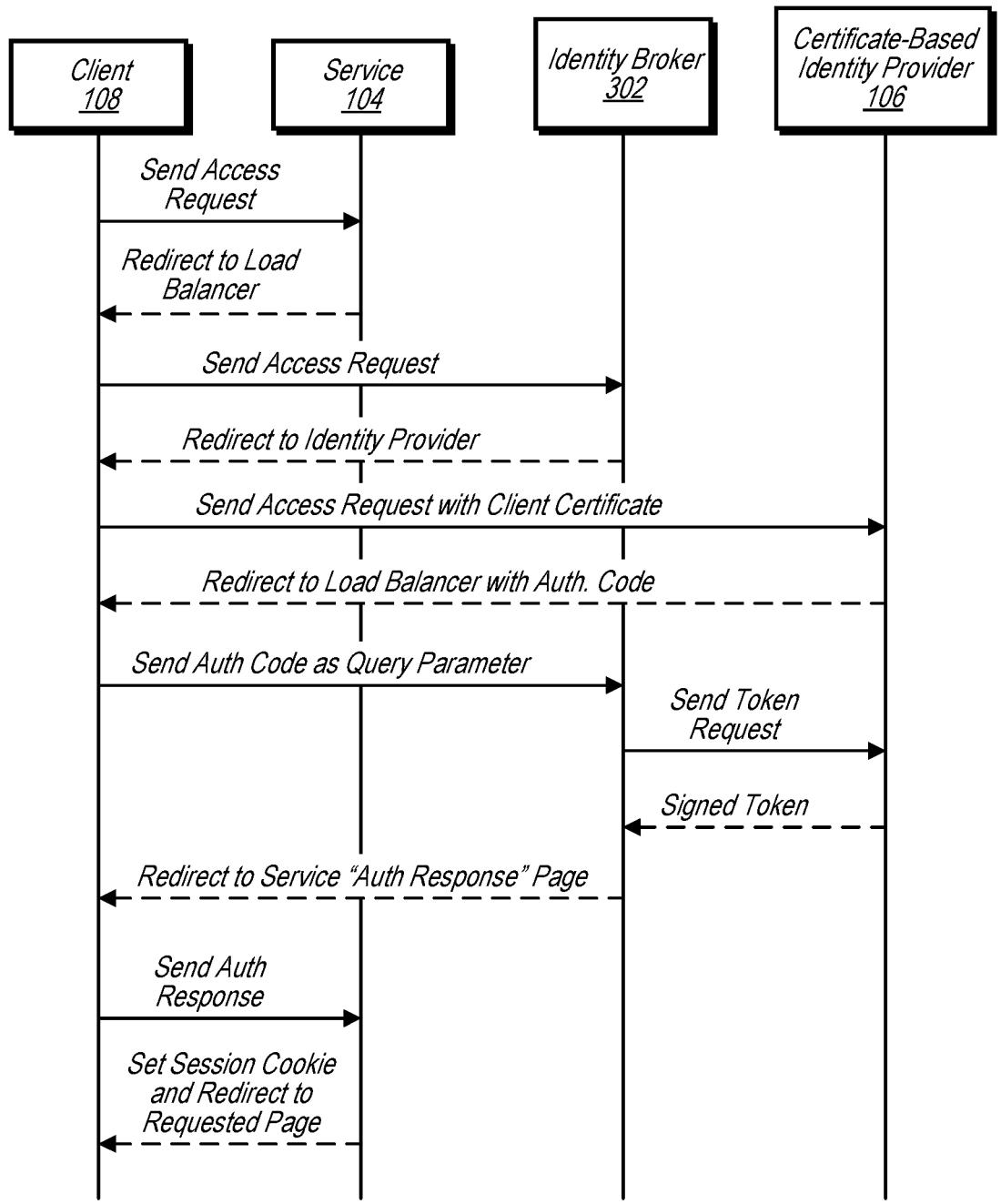
FIG. 3 illustrates performing client authentication for a service using an identity broker and a certificate-based identity provider, according to some embodiments.

FIG. 3 illustrates performing client authentication for a service using an identity broker and a certificate-based identity provider, according to some embodiments. This may be used by a service to take advantage of client authentication using a certificate-based identity provider, even though the service itself may be unable to use an identity protocol. As described below, an identity broker be used to communicate with the identity provider and obtain a signed token on behalf of the service.

As depicted, a client (e.g., external or internal client) sends a request (e.g., an unauthenticated request/access request) to a service. As shown, the service redirects the client to an identity broker 302. After the request is redirected to the identity broker 302, the identity broker redirects the request to a certificate-based identity provider 106 (e.g., in accordance with an identity protocol). As described herein, the certificate-based identity provider 106 generates a token, signs the token, and redirects the client to the identity broker (e.g., in accordance with an identity protocol).

The identity broker obtains the auth code as a query parameter and sends a token request to the certificate-based identity provider 106. The certificate-based identity provider 106 then returns the signed token to the identity broker. In some embodiments, the identity broker may convert the signed token into another credential to be used by the service for authentication. The identity broker then redirects the client to a web page for the service (e.g., an "auth response" page), where the client provides the signed token (or the converted credential) to the service as part of the request. In response to verifying the signed token or credential (e.g., as described herein), the service may then provide a response to the request (or provide the requested access to the client). As shown, this may include setting a session cookie and redirecting the client to a web page requested by the client (e.g., a web page indicated by or associated with the access request from the client).

Figure 4:
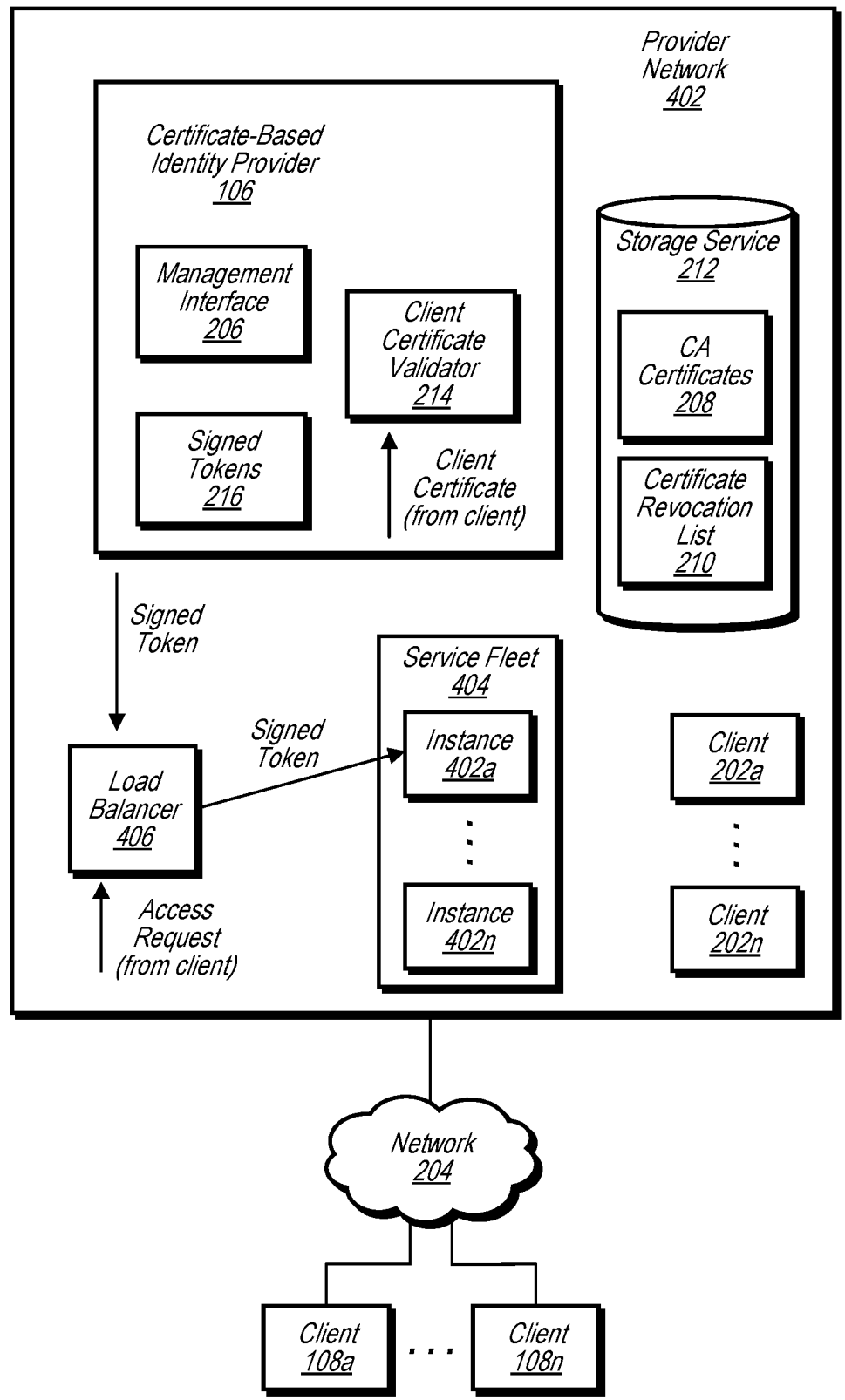
FIG. 4 a system for performing client authentication using a load balancer and certificate-based identity provider, according to some embodiments.

FIG. 4 a system for performing client authentication using a load balancer and certificate-based identity provider, according to some embodiments. As described below, the load balancer may be used to perform client authentication using a certificate-based identity provider on behalf of a service (e.g., on behalf of instances of a service).

As shown, there may be any number of external clients 108 and/or internal clients 202 of a service that is provided by different service instances 402 of a service fleet 404. In embodiments, a load balancer 406 receives requests from clients (e.g., unauthenticated requests/access requests). In some embodiments, the load balancer may be any service that is suitable for functioning as a front end for the service/service instances (e.g., a gateway service, request router, etc.).

In embodiments, the load balancer 406 may initially receive the request, which is an access request directed to the service provided by the instances 402. The load balancer may redirect the client to the certificate-based identity provider 106 in accordance with the identity protocol. The load balancer may obtain the signed token in accordance with the identity protocol (either implicit or auth code flow) and send the access request, which includes the signed token, to one of the instances 402 of the service fleet for the service (e.g., instance 402a).

In some embodiments, the load balancer may re-sign the token using a load balancer key (or generate another credential based on the signed token) and send the re-signed token/credential to the instance (e.g., by inserting it into a header of the request). The instance 402 may then obtain the singed token or the re-signed token/credential and provide the requested access to the client based on the identity token or the re-signed token/credential.

Figure 5:
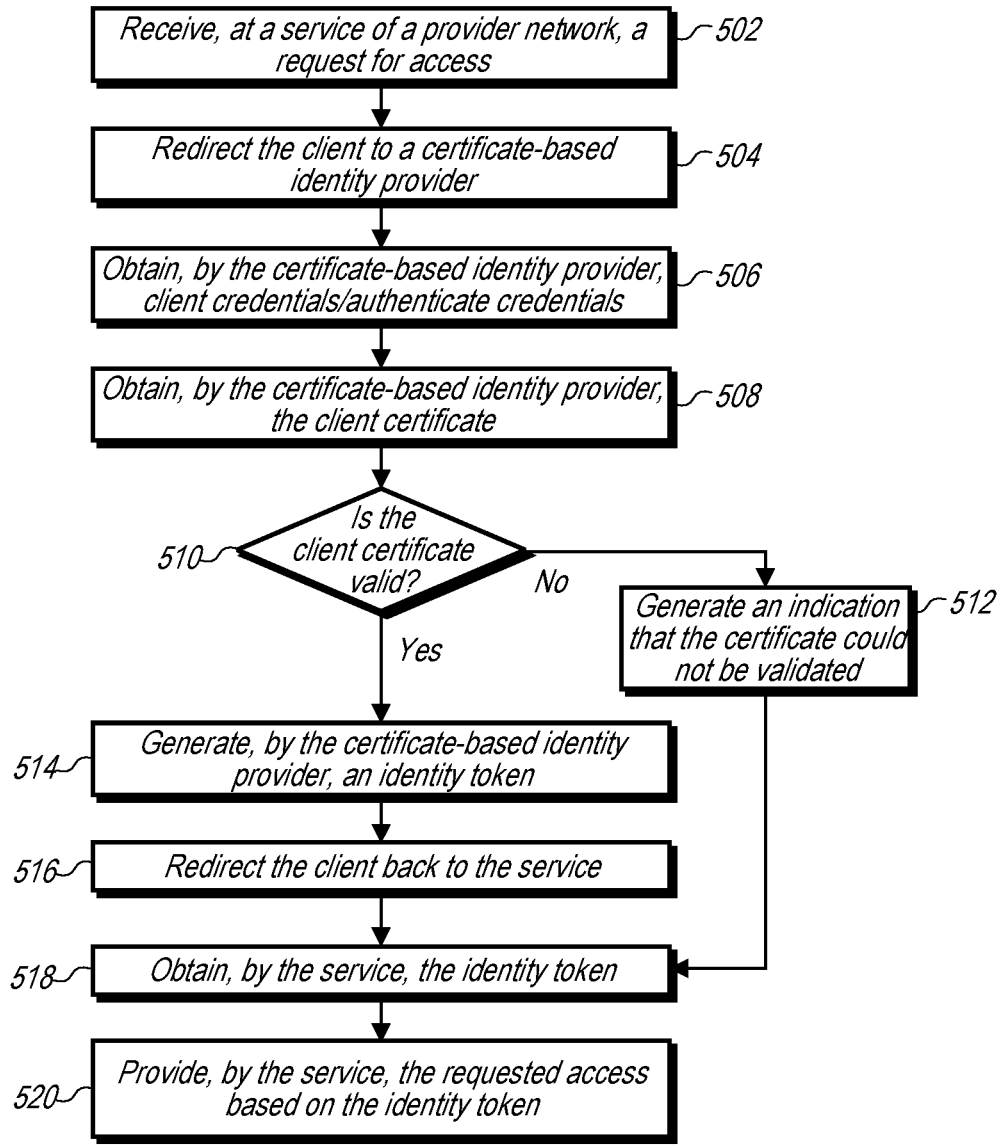
FIG. 5 is a flow diagram that illustrates performing client authentication using a certificate-based identity provider, according to some embodiments.

FIG. 5 is a flow diagram that illustrates performing client authentication using a certificate-based identity provider, according to some embodiments. At block 502, a service of the provider network receives a request for access. At block 504, the service redirects the client to a certificate-based identity provider in accordance with an identity protocol.

At block 506, the certificate-based identity provider obtains client credentials and authenticates the client credentials (e.g., username/password). At block 508, the certificate-based identity provider obtains a client certificate for the client (e.g., the client sends the certificate to the certificate-based identity provider).

At block 510, the certificate-based identity provider determines whether the client certificate is valid. If not, then the certificate-based identity provider invalidates the client certificate and at block 512, the certificate-based identity provider generates an indication that the certificate could not be validated. The process may then proceed to block 516, where the certificate-based identity provider redirects the client back to the service (along with the indication).

If the client certificate is valid, then at block 514, the certificate-based identity provider generates an identity token. At block 516, the certificate-based identity provider redirects the client back to the service. At block 518, the service obtains the identity token. As discussed herein, in embodiments, the implicit flow or the auth code flow may be used to obtain the token. At block 520, the service provides the requested access based on the identity token. For example, the service may provide the requested access in response to verifying/authenticating the token based on the digital signature of the token.

Figure 6A:
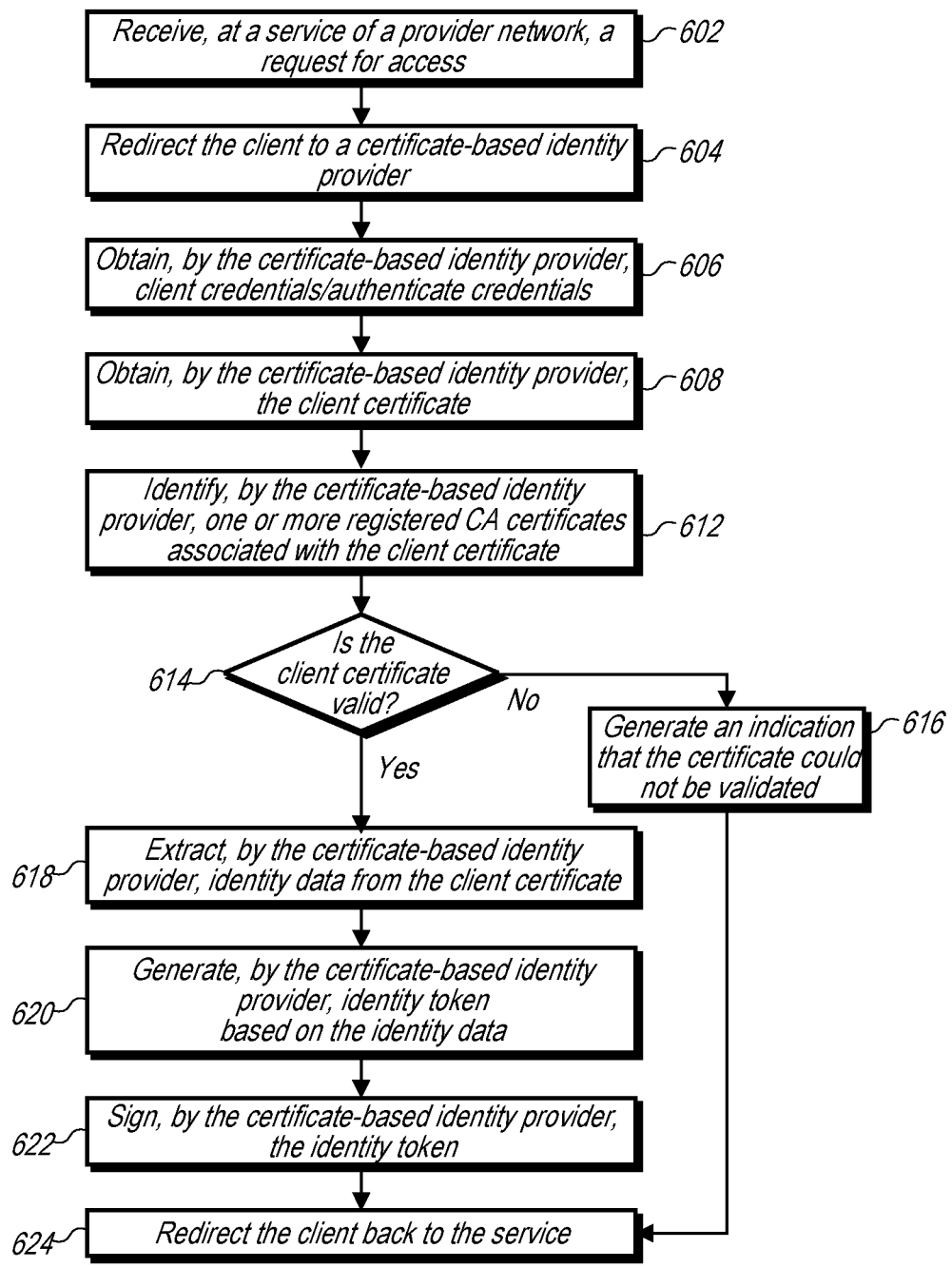
FIG. 6A is a flow diagram that illustrates performing client authentication using a certificate-based identity provider and redirecting a client back to a service, according to some embodiments.

FIG. 6A is a flow diagram that illustrates performing client authentication using a certificate-based identity provider and redirecting a client back to a service, according to some embodiments. At block 602, a service receives from a client a request for access. At block 604, the service redirects the client to a certificate-based identity provider. At block 606, the certificate-based identity provider obtains client credentials and authenticates the client credentials (e.g., username/password).

At block 608, the certificate-based identity provider obtains a client certificate for the client (e.g., the client sends the certificate to the certificate-based identity provider). At block 612, the certificate-based identity provider identifies one or more registered CA certificates based on the identifier (e.g., CA certificates or registered CA certificates from the same CA as the CA indicated by the client certificate and/or the identifier for the client).

At block 614, the certificate-based identity provider determines whether the client certificate is valid (e.g., whether the client certificate was signed by a trusted CA). If not, then the certificate-based identity provider invalidates the client certificate and at block 616, the certificate-based identity provider generates an indication that the certificate could not be validated. The process may then proceed to block 624, where the certificate-based identity provider redirects the client back to the service (along with the indication).

If the client certificate is valid, then at block 618, the certificate-based identity provider extracts identity data from the client certificate (e.g., data specific to or unique to the client, such as personal data, credential-related data, username, and/or various other client-specific attributes). At block 620, the certificate-based identity provider generates an identity token based on the extracted identity data. At block 622, the certificate-based identity provider signs the identity token. At block 624, the certificate-based identity provider then redirects the client back to the service (e.g., in accordance with the identity protocol).

Figure 6B:
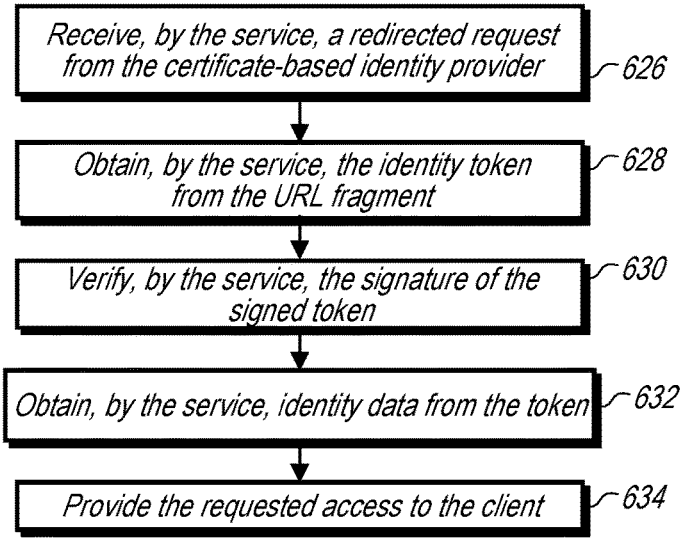
FIG. 6B is a flow diagram that illustrates a service that obtains an identity token from a uniform resource locator (URL), according to some embodiments.

FIG. 6B is a flow diagram that illustrates a service that obtains an identity token from a URL (e.g., implicit flow), according to some embodiments. FIG. 6B begins at the last block of FIG. 6A. At block 626, the service receives a redirected request from the certificate-based identity provider.

At block 628, the service obtains the signed identity token from a fragment in the URL for the redirected request. At block 630, the service verifies the signature of the identity token. At block 632, the service obtains identity data from the token. At block 634, the service provides the requested access to the client (e.g., based on identity data/permission data from the token).

Figure 6C:
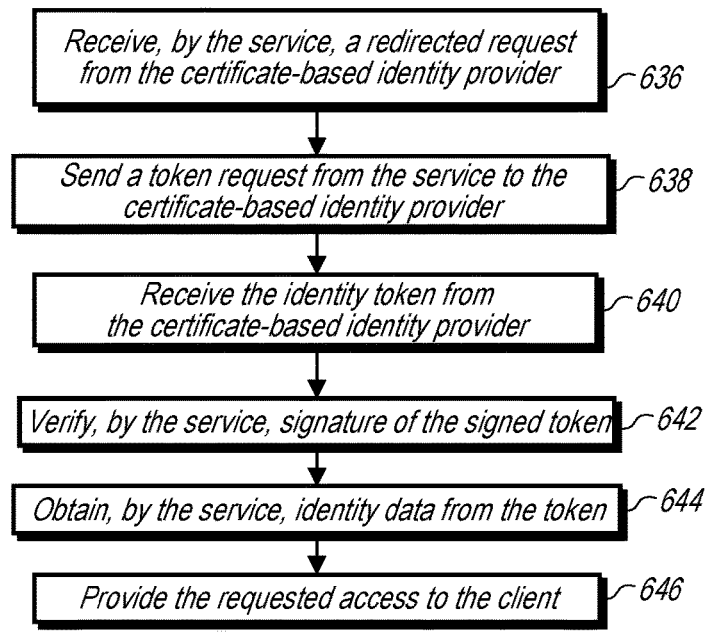
FIG. 6C is a flow diagram that illustrates a service that obtains an identity token from a certificate-based identity provider, according to some embodiments.

FIG. 6C is a flow diagram that illustrates a service that obtains an identity token from a certificate-based identity provider, according to some embodiments. FIG. 6B begins at the last block of FIG. 6A. At block 636, the service receives a redirected request from the certificate-based identity provider.

At block 638, the service sends a token request to the certificate-based identity provider. At block 640, the service receives the identity token from the certificate-based identity provider. At block 642, the service verifies the signature of the token. At block 644, the service obtains identity data from the token. At block 646, the service provides the requested access to the client (e.g., based on identity data/permission data from the token).

Figure 7:
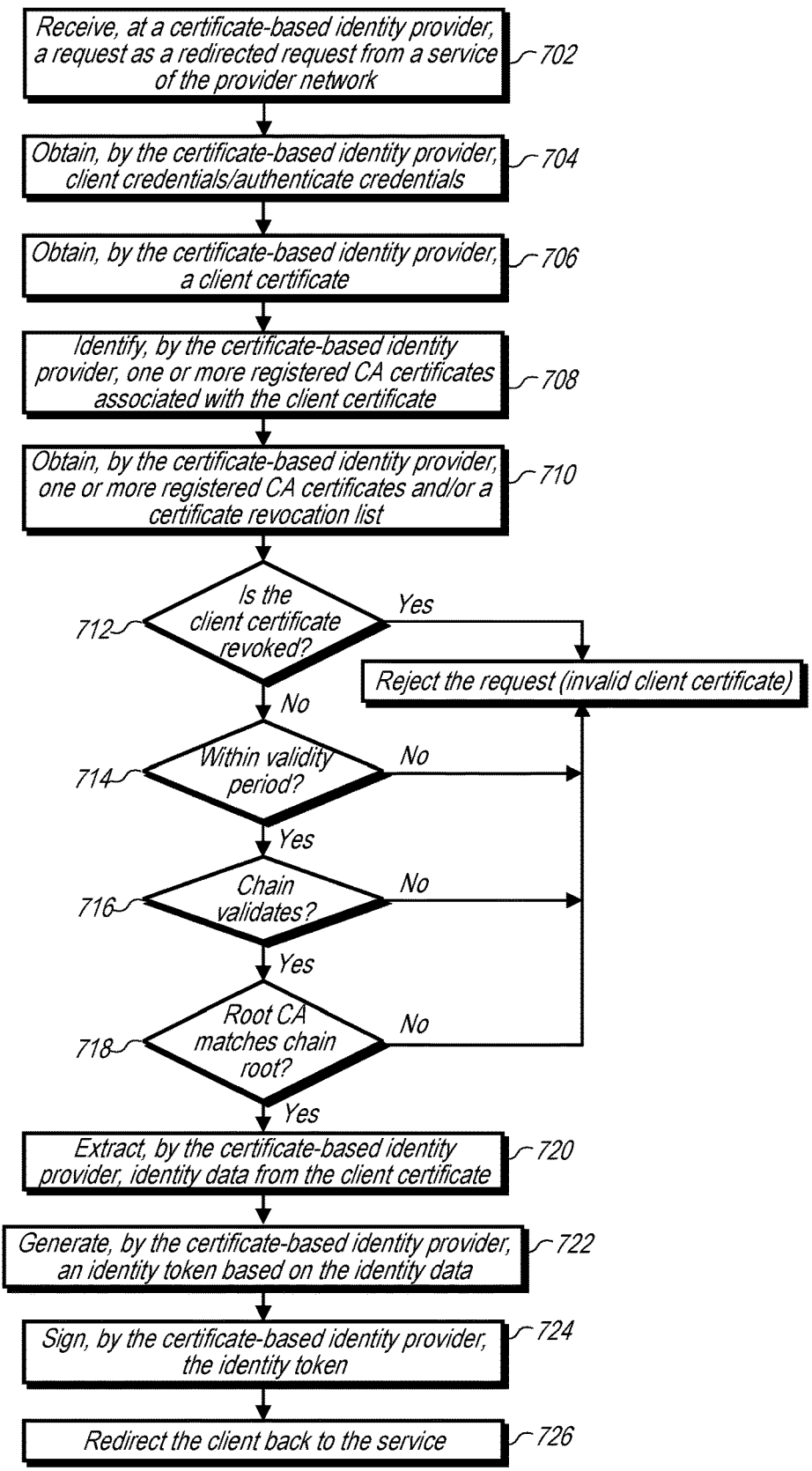
FIG. 7 is a flow diagram that illustrates validating a client certificate using a certificate-based identity provider, according to some embodiments.

FIG. 7 is a flow diagram that illustrates validating a client certificate using a certificate-based identity provider, according to some embodiments. At block 702, the certificate-based identity provider receives a request as a redirected request from a service of the provider network. At block 704, the certificate-based identity provider obtains client credentials for the client and authenticates the credentials.

At block 706, the certificate-based identity provider obtains a client certificate for the client. At block 708, the certificate-based identity provider identifies one or registered CA certificates and/or a certificate revocation list based on the client certificate (e.g., based on an identifier/name of the issuing CA indicated by the client certificate and/or client request). At block 710, the certificate-based identity provider obtains the one or more registered CA certificates and/or the certificate revocation list (CRL).

At block 712, the certificate-based identity provider determines, based on the CRL, whether the client certificate is revoked. If so, then the access request is rejected. In embodiments, instead of ending at the rejection point, the process proceeds to block 726, as in FIG. 6. If not, then the process proceeds to block 714.

At block 714, the certificate-based identity provider determines, based on the data in the client certificate (e.g., a validity period for the client certificate), whether the client certificate is within a validity period (e.g., whether the current date and/or time is within the validity period for the client certificate). If not, then the access request is rejected (e.g., the client certificate is expired and/or invalid). In embodiments, instead of ending at the rejection point, the process proceeds to block 726, as in FIG. 6. If so, then the process proceeds to block 716.

At block 716, the certificate-based identity provider determines, based on one or more registered CA certificates (e.g., trusted certificate chain), whether the client certificate is validated. If not, then the access request is rejected. In embodiments, instead of ending at the rejection point, the process proceeds to block 726, as in FIG. 6. If so, then the process proceeds to block 718.

At block 718, the certificate-based identity provider determines whether the root CA matches the chain root. If not, then the access request is rejected. In embodiments, instead of ending at the rejection point, the process proceeds to block 726, as in FIG. 6. If so, then the process proceeds to block 720. In embodiments, one or more of blocks 712-718 may be skipped (e.g., not performed).

At block 720, the certificate-based identity provider extracts identity data from the client certificate (e.g., data specific to or unique to the client, such as personal data, credential-related data, username, and/or various other client-specific attributes). At block 722, the certificate-based identity provider generates an identity token based on the extracted identity data.

At block 724, the certificate-based identity provider signs the identity token. At block 726, the certificate-based identity provider then redirects the client back to the service (e.g., in accordance with the identity protocol).

Figure 8:
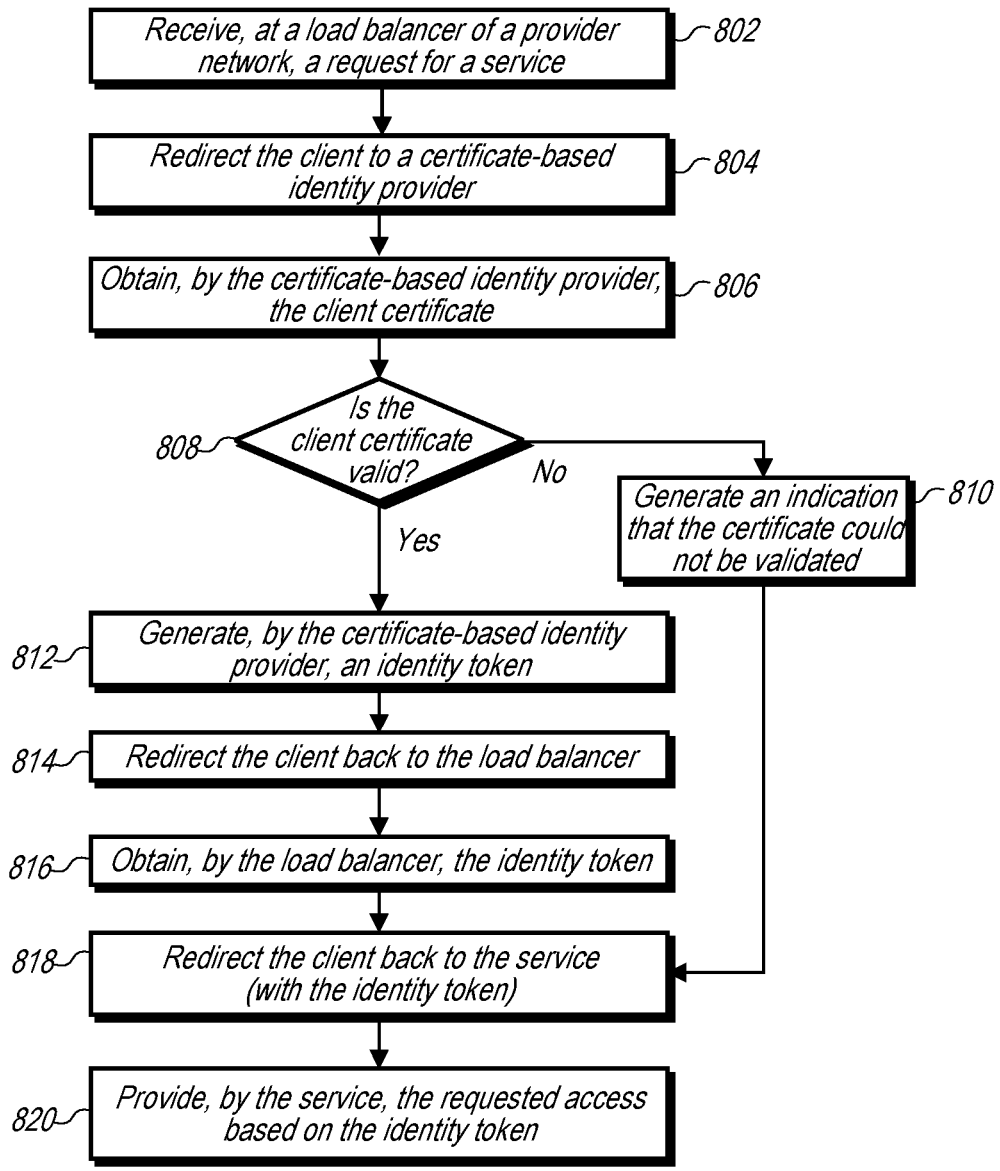
FIG. 8 is a flow diagram that illustrates performing client authentication using a load balancer and a certificate-based identity provider, according to some embodiments.
Figure 9:
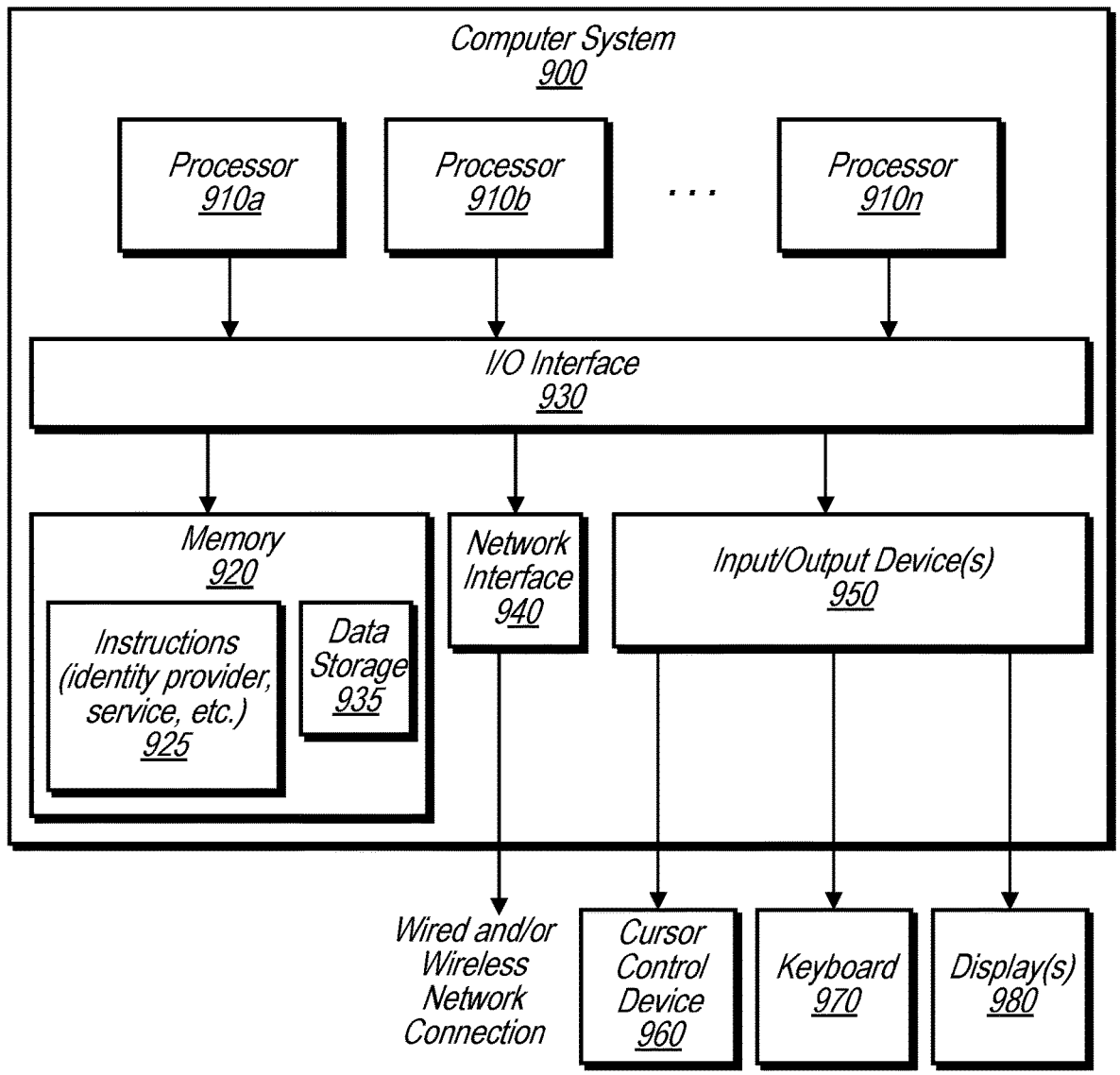
FIG. 9 is a block diagram illustrating an example computer system that implements some or all of the techniques described herein, according to some embodiments.

FIG. 8 is a flow diagram that illustrates performing client authentication using a load balancer and a certificate-based identity provider, according to some embodiments. At block 802, a load balancer (e.g., a service that provides load balancing functionality) receives a request for access. At block 804, the load balancer redirects the client to a certificate-based identity provider. At block 806, the certificate-based identity provider obtains the client certificate.

At block 808, the certificate-based identity provider determines whether the client certificate is valid. If not, then the certificate-based identity provider invalidates the client certificate and at block 810, the certificate-based identity provider generates an indication that the certificate could not be validated. The process may then proceed to block 818, where the certificate-based identity provider redirects the client back to the service (along with the indication).

If the client certificate is valid, then at block 812, the certificate-based identity provider generates an identity token (and signs the token). At block 814, the certificate-based identity provider redirects the client back to the load balancer. At block 816, the load balancer obtains the signed identity token. As discussed herein, in embodiments, the implicit flow or the auth code flow may be used to obtain the signed identity token.

At block 818, the load balancer redirects the client back to a service and/or a service instance of the service (along with providing the signed token to the service). In some embodiments, the load balancer re-signs the token with other credentials (e.g., another key) or converts the signed identity token into another credential and provides the re-signed token or other credential to the service. At block 820, the service provides the requested access based on the signed identity token or the re-signed identity token/other credential. For example, the service may provide the requested access to a requesting client in response to verifying/authenticating the signed token based on the digital signature of the token. For example, the service may provide the requested access by setting a session cookie and redirect the client to a requested page.

Any of various computer systems may be configured to implement processes associated with the identity provider, service, load balancer, or any other component of the above figures. For example, FIG. 9 is a block diagram illustrating an example computer system that implements some or all of the techniques described herein, according to some embodiments.

In various embodiments, the identity provider, service, load balancer, or any other component of any of FIGS. 1-6 may each include one or more computer systems 900 such as that illustrated in FIG. 9. In embodiments, the identity provider, service, load balancer, or any other component may include one or more components of the computer system 900 that function in a same or similar way as described for the computer system 900.

In the illustrated embodiment, computer system 900 includes one or more processors 910 coupled to a system memory 920 via an input/output (I/O) interface 930. Computer system 900 further includes a network interface 940 coupled to I/O interface 930. In some embodiments, computer system 900 may be illustrative of servers implementing enterprise logic or downloadable application, while in other embodiments servers may include more, fewer, or different elements than computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be embedded processors implementing any of a variety of instruction set architectures (ISAs), such as the x106, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor 910. In various embodiments, system memory 920 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above (e.g., for the identity provider, service, load balancer, etc.), are shown stored within system memory 920 as program instructions 925. In some embodiments, system memory 920 may include data 935 which may be configured as described herein.

In one embodiment, I/O interface 930 may be configured to coordinate I/O traffic between processor 910, system memory 920 and any peripheral devices in the system, including through network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments, some or all of the functionality of I/O interface 930, such as an interface to system memory 920, may be incorporated directly into processor 910.

Network interface 940 may be configured to allow data to be exchanged between computer system 900 and other computer systems 900 or devices attached to a network, such as the local network discussed above, a wide-area network, or a local network within the provider network, for example. In particular, network interface 940 may be configured to allow communication between computer system 900 and/or various I/O devices 950. I/O devices 950 may include scanning devices, display devices, input devices and/or other communication devices, as described herein. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet networks, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above. However, in other embodiments, program instructions and/ or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 900 via I/O interface 930. A computer-readable storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In some embodiments, I/O devices 950 may be relatively simple or "thin" client devices. For example, I/O devices 950 may be configured as dumb terminals with display, data entry and communications capabilities, but otherwise little computational functionality. However, in some embodiments, I/O devices 950 may be computer systems configured similarly to computer system 900, including one or more processors 910 and various other devices (though in some embodiments, a computer system 900 implementing an I/O device 950 may have somewhat different devices, or different classes of devices).

In various embodiments, I/O devices 950 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 950 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 900. In general, an I/O device 950 (e.g., cursor control device 960, keyboard 970, or display(s) 970 may be any device that can communicate with elements of computing system 900.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the identity provider, service, load balancer, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
    one or more computing devices of a provider network to implement one or more services, wherein at least one of the services is configured to:
        receive one or more requests for access from one or more clients; and
        in response to receiving the one or more requests for access at the service of the provider network, redirect the one or more clients to a certificate-based identity provider of the provider network in accordance with an identity protocol; and
    one or more other computing devices of the provider network to implement the certificate-based identity provider, wherein for individual ones of the redirected requests, the certificate-based identity provider is configured to:
        obtain a client certificate for the client, wherein the client certificate was issued to the client by a certificate authority;
        validate the client certificate;
        in response to validating the client certificate by the certificate-based identity provider of the provider network:
            generate an identity token based on identity data of the client; and
            redirect, by the certificate-based identity provider of the provider network, the client to the service of the provider network in accordance with the identity protocol,
    wherein the service is further configured to:
        obtain the identity token; and
        provide the requested access to the client based on the identity token.

2. The system of claim 1, wherein to validate the client certificate, the certificate-based identity provider is configured to:
    identify one or more registered certificate authority certificates associated with the client certificate;
    validate the client certificate based on other information associated with at least one of the registered certificate authority certificates.

3. The system of claim 1, wherein the request is for access to another service, wherein the system further comprises one or more additional computing devices of the provider network configured to implement the other service, and wherein to provide the requested access to the client, the service is configured to:

redirect the client to the other service, wherein the other service is configured to:
obtain the identity token; and
provide the requested access to the other service based at least on the identity token.

4. The system of claim 3, wherein the service is further configured to:
receive the request for access as a redirected request for the other service; and
redirect the request for access to the certificate-based identity provider in accordance with the identity protocol.

5. The system of claim 1, wherein the certificate-based identity provider is further configured to:
obtain credentials for the client; and
authenticate the credentials based on security information associated with the client.

6. A method, comprising:
performing, by a plurality of computing devices of a provider network:
for individual ones of requests for access from one or more clients:
receiving the request at a service of the provider network;
in response to receiving the request for access at the service of the provider network, redirecting, by the service, the client to a certificate-based identity provider of the provider network in accordance with an identity protocol;
obtaining, by the certificate-based identity provider, a client certificate for the client, wherein the client certificate was issued to the client by a certificate authority;
validating, by the certificate-based identity provider, the client certificate;
in response to validating the client certificate by the certificate-based identity provider of the provider network:
generating, by the certificate-based identity provider, an identity token based on identity data of the client; and
redirecting, by the certificate-based identity provider of the provider network, the client to the service of the provider network in accordance with the identity protocol,
obtaining, by the service, the identity token; and
providing, by the service, the requested access to the client based on the identity token.

7. The method as recited in claim 6, wherein validating the client certificate comprises:
identifying one or more registered certificate authority certificates associated with the client certificate; and
validating the client certificate based on security information associated with at least one of the registered certificate authority certificates.

8. The method as recited in claim 7, further comprising:
downloading, by the certificate-based identity provider, the one or more registered certificate authority certificates from a storage location of the provider network or from a remote network.

9. The method as recited in claim 7, further comprising:
obtaining, by the certificate-based identity provider, credentials for the client; and
authenticating, by the certificate-based identity provider, the credentials based on security information associated with the client.

10. The method as recited in claim 6, wherein validating the client certificate comprises:
downloading, by the certificate-based identity provider, a certificate revocation list from a storage location of the provider network or from a remote network; and
determining, by the certificate-based identity provider, whether the client certificate is revoked based on the certificate revocation list.

11. The method as recited in claim 6, wherein generating the identity token comprises:
extracting, by the certificate-based identity provider, identity data from the client certificate;
generating, by the certificate-based identity provider, the identity token based on the extracted identity data; and
signing, by the certificate-based identity provider, the token using a private key of the certificate-based identity provider, wherein the private key is inaccessible to the service or the clients.

12. The method as recited in claim 6, wherein the request is for access to another service, and wherein providing the requested access to the client comprises:
redirecting, by the service, the client to the other service;
obtaining, by the other service, the identity token; and
providing, by the other service, the requested access to the other service based at least on the identity token.

13. The method as recited in claim 12, further comprising:
receiving, by the service, the request for access as a redirected request for the other service; and
redirecting, by the service, the request for access to the certificate-based identity provider in accordance with the identity protocol.

14. The method as recited in claim 6, wherein obtaining the identity token comprises:
obtaining the identity token from a uniform resource locator (URL) associated with the request, or
obtaining a code associated with the request;
providing the code and other security information to the certificate-based identity provider; and
receiving the identity token from the certificate-based identity provider.

15. One or more non-transitory computer-accessible storage media storing program instructions that when executed on or across one or more processors cause the one or more processors to implement a certificate-based identity provider of a provider network to:
for individual ones of requests for access from one or more clients of a service of the provider network:
receive, at the certificate-based identity provider of the provider network, the request for access as a redirected request from the service of the provider network;
obtain a client certificate for the client, wherein the client certificate was issued to the client by a certificate authority;
validate the client certificate;
in response to validating the client certificate by the certificate-based identity provider of the provider network:
generate an identity token based on identity data of the client; and
redirect, by the certificate-based identity provider of the provider network, the client to the service of the provider network in accordance with the identity protocol, wherein the certificate-based identity provider makes the identity token available for access by the service.

16. The one or more storage media as recited in claim 15, wherein to validate the client certificate, the program instructions when executed on or across the one or more processors further cause the one or more processors to:
- identify one or more registered certificate authority certificates associated with the client certificate; and
- validate the client certificate based on security information associated with at least one of the registered certificate authority certificates.

17. The one or more storage media as recited in claim 16, further comprising program instructions when executed on or across the one or more processors further cause the one or more processors to:
- download, by the certificate-based identity provider, the one or more registered certificate authority certificates from a storage location of the provider network or from a remote network.

18. The one or more storage media as recited in claim 16, further comprising program instructions that when executed on or across the one or more processors further cause the one or more processors to:
- obtain, by the certificate-based identity provider, credentials for the client; and
- authenticate, by the certificate-based identity provider, the credentials based on security information associated with the client.

19. The one or more storage media as recited in claim 15, wherein to validate the client certificate, the comprising program instructions when executed on or across the one or more processors further cause the one or more processors to:
- determine, by the certificate-based identity provider, whether the client certificate is expired;
- download, by the certificate-based identity provider, a certificate revocation list from a storage location of the provider network or from a remote network; and
- determine, by the certificate-based identity provider, whether the client certificate is revoked based on the certificate revocation list.

20. The one or more storage media as recited in claim 15, wherein to generate the identity token, the program instructions when executed on or across the one or more processors further cause the one or more processors to:
- extract, by the certificate-based identity provider, identity data from the client certificate; and
- generate, by the certificate-based identity provider, the identity token based on the extracted identity data.

* * * * *